United States Patent [19]

Eckhardt et al.

[11] Patent Number: 5,248,283
[45] Date of Patent: Sep. 28, 1993

[54] TRANSMISSION

[75] Inventors: Uli Eckhardt, Speyer; Anja Esau, Soellingen, both of Fed. Rep. of Germany

[73] Assignee: Deere & Company, Moline, Ill.

[21] Appl. No.: 880,850

[22] Filed: May 11, 1992

[30] Foreign Application Priority Data

May 14, 1991 [DE] Fed. Rep. of Germany ....... 4115624

[51] Int. Cl.$^5$ ............................................. F16H 57/10
[52] U.S. Cl. ...................................... 475/72; 464/149; 74/413
[58] Field of Search ........................... 475/72, 73, 346; 464/149, 156; 74/397, 413

[56] References Cited

U.S. PATENT DOCUMENTS

| | | | |
|---|---|---|---|
| 3,973,880 | 8/1976 | Swedberg | 464/156 X |
| 4,090,416 | 5/1978 | Hicks | 475/346 X |
| 4,132,090 | 1/1979 | McDermott | 464/156 |
| 4,378,163 | 3/1983 | Jameson et al. | 366/63 |
| 4,854,184 | 8/1989 | Jessup | 74/411 |
| 4,934,216 | 6/1990 | Sandel et al. | 464/156 X |

FOREIGN PATENT DOCUMENTS

| | | |
|---|---|---|
| 0292867 | 2/1989 | European Pat. Off. |
| 0302188 | 8/1989 | European Pat. Off. |
| 897500 | 11/1953 | Fed. Rep. of Germany |
| 2707699 | 8/1978 | Fed. Rep. of Germany |
| 3512523 | 9/1986 | Fed. Rep. of Germany |
| 3543926 | 6/1987 | Fed. Rep. of Germany |
| 3707382 | 9/1988 | Fed. Rep. of Germany ........ 475/72 |
| 2024117 | 8/1970 | France |
| 483235 | 10/1954 | Italy ..................... 464/149 |
| 58-102849 | 6/1983 | Japan ..................... 475/72 |
| 452288 | 2/1968 | Switzerland |
| 2011561 | 7/1979 | United Kingdom ................. 475/72 |

*Primary Examiner*—Allan D. Herrmann
*Assistant Examiner*—William O. Trousdell

[57] ABSTRACT

A vehicle transmission has two shafts parallel to one another. At least one of the shafts is formed of two partial shafts which are in alignment and axially spaced apart. A torsion shaft then connects the two for rotation with each other, but prevents transmission of bending moments between the partial shafts. This structure is particularly useful in a hydrostatic-mechanical power distributing transmission, in which the torsion shaft is radially aligned with the planetary gearsets of the power distributing transmission. The torsion shaft can be considerably thinner than the comparable portion of a conventional shaft, so the overall transmission can be more compact radially. The transmission also is provided with unequal gear ratios, while the planetary gearsets are the same size, allowing a particularly compact structure. Preferably, one of the gear ratios with a small control ratio is used as the primary working range for the transmission to maximize efficiency.

15 Claims, 3 Drawing Sheets

TRANSMISSION

BACKGROUND OF THE INVENTION

1. Field of the Invention

The present invention relates to transmissions having at least two shafts arranged parallel to each other, and in particular to a vehicle transmission for agricultural or utility vehicles.

2. Description of the Related Art

In transmissions used, for example, in agricultural tractors, torque frequently is transmitted over very long parallel shafts, which support the gears needed to provided various gear ratios. These shafts are designed to transmit large torques, and therefore must withstand correspondingly large bending moments. Undesirable bending deflection caused by vibrations or the radial forces applied by the gears can be avoided by correspondingly large shaft diameters, or by supporting the shafts in multiple bearings.

The bending load on a shaft that is supported in bearings only at its ends increases from the bearing to the center of the shaft. It is largest in the areas of the shaft at which radial forces are applied. This loading can be absorbed by a corresponding design of the shaft thickness, in which the diameter of the shaft increase from the bearings towards the center. However, thick shafts are costly, and increase the weight of the transmission. Furthermore, they occupy space that cannot then be used for other gearbox components.

Supporting a shaft on multiple bearings results in a statically indeterminate load. It requires very precise alignment of the bearings to each other, so that the bearings themselves do not create additional forces which would result in increased bearing loads. A very high degree of precision therefore is required in the manufacture and alignment of the bearings, which can be achieved only with difficulty. Such precision is particularly difficult to achieve if the bearings are mounted in different gearbox housings, and therefore cannot be machined as a unit.

A hydrostatic-mechanical power distributing transmission providing a continuously variable transmission ratio for vehicles, in particular for agricultural or utility vehicles, is a good example of a transmission of the type having parallel shafts. Such transmissions typically include a hydrostatic drive continuously variable between two extreme positions, with a variable flow and a constant flow positive displacement device, and a compound gearbox which includes at least two planetary gearsets.

Vehicle transmissions generally are used to allow the vehicle engine to operate so that its output torque follows as closely as possible the maximum power characteristic at the desired vehicle speed. In doing so, the transmission varies the torque as well as the rotational speed. Continuously variable drives have the advantage over mechanical multi-speed gearboxes that they can operate at optimum engine speed at every vehicle speed condition. There is no interruption in power during shifting, which contributes greatly to driving comfort, especially with a work vehicle under load. Such transmissions are particularly useful for agricultural and utility vehicles, which in addition to the vehicle drive frequently have at least one additional power take off shaft (PTO). The rotational speed of the typical PTO is controlled independently of the vehicle ground speed, which is difficult if the engine speed is constantly varying.

EP-A1-0 302 188 and DE-A-35 12 523 show examples of such continuously variable drives. In these transmissions, the power supplied by the engine is distributed directly to a first input shaft of a compound gearbox and to a second input shaft via a hydraulic drive. The hydraulic drive contains a constant power device with constant volume flow and a variable power device with variable volume flow. By adjusting the variable power device, the rotational output of the hydraulic drive can range from negative rotational speeds to positive rotational speeds. The output shaft of the hydraulic drive then is connected to the second input shaft of the compound gearbox. (While referred to as an "input" shaft, this second "input" shaft can act as either an input or an output shaft, depending on which gears are engaged and the operational position of the hydraulic drive.) The compound gearbox combines the torques and rotational speeds of the engine and hydraulic drive to produce a final output.

The compound gearboxes in these references contain a double planetary gearset whose two sun gears are arranged on the aforementioned second input shaft. The first input shaft of the mechanical drive is connected to the planetary carrier of one of the planetary gearsets and to the ring gear of the other planetary gearset. Each planetary gearset of the compound gearbox is provided with a separate output shaft, which is connected to two sets of mechanical drives which can be engaged by shifter clutches.

The two planetary gearset output shafts behave differently upon adjustment of the variable speed hydraulic device. As the variable speed device is adjusted upward, the speed of the first output shaft increases, while the speed of the second output shaft decreases. The reverse is true when the variable speed device is adjust downwards. The synchronous conditions necessary for smooth power transmission are attained at the limit of each speed ratio, so it is possible using this structure to have a largely continuous increase or decrease in rotational speed at the output shaft of the entire transmission.

To cover a wide range of operating conditions, the overall range of gear ratios should be as wide as possible. The individual control ratio at a given gearbox input speed is the ratio of the maximum to minimum output speed of the variable speed device. The total control ratio is then this individual control ratio multiplied by the control ratios of gear ratios in the mechanical gearset.

With increasing total control ratio, however, the maximum required proportion of hydraulic power increases considerably. The ratio of maximum hydraulic power to the total control of the transmission is equal to the individual control ratio minus one, and divided by two. Since the hydrostatic transmission of power is less efficient than mechanical transmission by gears alone, the individual control ratio should be kept as small as possible.

In addition, a compound gearbox of this type usually requires a larger radial space than a mechanical transmission of the same capacity. This means a power distributing transmission cannot be exchanged for a mechanical multi-speed gearbox in a given vehicle, which would otherwise be desirable to provide the largest flexibility.

SUMMARY OF THE INVENTION

The object of the present invention is to provide a transmission of the type having at least two shafts parallel to each other, but which avoid the aforementioned shaft diameter and manufacturing precision problems. In particular, it is the object of the invention to provide a transmission in which the shaft diameters can be kept relatively small, which can be manufactured at low cost and which is compact.

These objects are achieved according to the present invention by forming at least one of the two parallel shafts in three parts: two partial shafts that are aligned with each other and spaced axially, and which are connected by a torsion shaft positively locked, e.g., by a spline coupling, to each of the partial shafts. The torsion shaft transmits pure torque only, not bending moments, between the two partial shafts.

A simple embodiment for this structures provides an internally splined recess in the end faces of each of the partial shafts. The torsion shaft then is positioned with its ends inside the recess on the partial shafts, with external splines on the torsion shaft ends meshing with the internal splines on the partial shafts. Enough space, for example, 2 mm or so, is provided in the final placement between the ends of the torsion shaft and the bottoms of the recesses that the torsion shaft "floats" between the partial shafts. This assures that the torsion shaft will only transmit torque, not bending moments.

Preferably, the splines are formed as involute gear teeth, with the teeth extending radially. This will help ensure that the torsion shaft floats freely. The teeth preferably are formed by roll-forming. This cold-working process compacts the material, rather than removing it with metal-cutting teeth, resulting in increased strength of the splines.

The torsion shaft preferably is provided with a central bore to conduct lubricant or coolant between the two partial shafts. The meshing of the splines generally will provide adequate sealing between the ends of the torsion shaft and the recesses of the partial shafts, so no additional sealing will typically be required.

This structure has several advantages. Since the torsion shaft transmits pure torque only, not bending moments, it can be designed much thinner than the equivalent part of a conventional continuous, single shaft. It also can be considerably thinner than the two partial shafts. Preferably, its diameter is only half as large as that of the partial shafts.

Each of the partial shafts is much shorter and more compact than the conventional single shaft they collectively replace. Such smaller shafts can be manufactured at considerably lower cost and with greater precision than long shafts, which deflect during turning operations and can warp during heat treatment.

The bearings of the partial shafts can be smaller, since the bending moments are minimized and therefore so are the forces on the bearings.

The partial shafts and their associated bearings also can be sized differently to have only the strength sufficient to correspond to their actual loading and frequency of operation. A comparable conventional shaft must be designed for the highest load expected.

Both the partial shafts and the torsion shaft can be much thinner than a conventional shaft, which makes this design particularly useful in gearbox structures in which a shaft is confined radially by other components. Using this feature of the invention, a power distributing transmission can be produced which is considerably more compact than those described above.

According to a preferred embodiment of the invention, a power distributing transmission has a gearbox output shaft formed of two partial shafts positively locked for rotation with each other by a torsion shaft. Each of the partial shafts carries gears for at least one gear ratio. The torsion shaft, which preferably has a smaller diameter than the partial shafts, is located axially in line with the planetary gearsets. This provides greater radial space for the planetary gearsets than was available in the earlier transmissions, without interfering with any adjacent shafts.

Preferably, each of the partial shafts carries gears for at least two gear ratios. This further compacts the structure, and minimizes the distance between the gearbox input and output shafts.

According to yet a further aspect of the invention, the gear ratios of the mechanical transmission are not equally spaced, while the planetary gearsets are equally sized. The prior power distributing systems were designed with the assumption that the gear ratios had to be equally spaced. One consequence of this was that the planetary gearset had to be of different sizes for the system to work properly, with the ring gear of one planetary gearset being larger than the ring gear of the other. Unfortunately, this meant that the radial dimensions of the transmission had to be large enough to accommodate the larger of the two planetary gearsets, and that different parts had to be provided for each planetary gearset.

The present invention recognizes that this equal spacing of the gear ratios is not a true design requirement. Without it, identical planetary gearsets can be employed. This minimizes the number of different parts required. In addition, it has been found that both planetaries can be the size of the smaller of the planetaries previously used, minimizing the dimensions of the transmission.

Since the gear ratios are now of different spacings, preferably one of the gear ratios with a small control ratio is the one in the principal operating range of the vehicle, for example, the ratio used for across-the-field work with an agricultural tractor. The lower the control ratio, the lower the hydrostatic losses and the greater the overall efficiency of the transmission. Thus, using a smaller control ratio in the range where the vehicle will be operated the most increases the overall average efficiency of the transmission.

The preferred embodiment for the planetary gearsets uses a single set of through gear teeth on one shaft as the sun gears of both planetaries, thereby minimizing the costs of production. In planetary gearsets, it normally is preferable to support a shaft so that it can move radially, so that all gear meshes of the gearset are equally loaded and static redundancy is minimized. The sun gear shaft therefore preferably is mounted elastically, and is supported by all of the planetary gears.

BRIEF DESCRIPTION OF THE DRAWINGS

The invention will be further described with references to the drawings, in which.

DETAILED DESCRIPTION OF THE PREFERRED EMBODIMENTS

Figure 1:
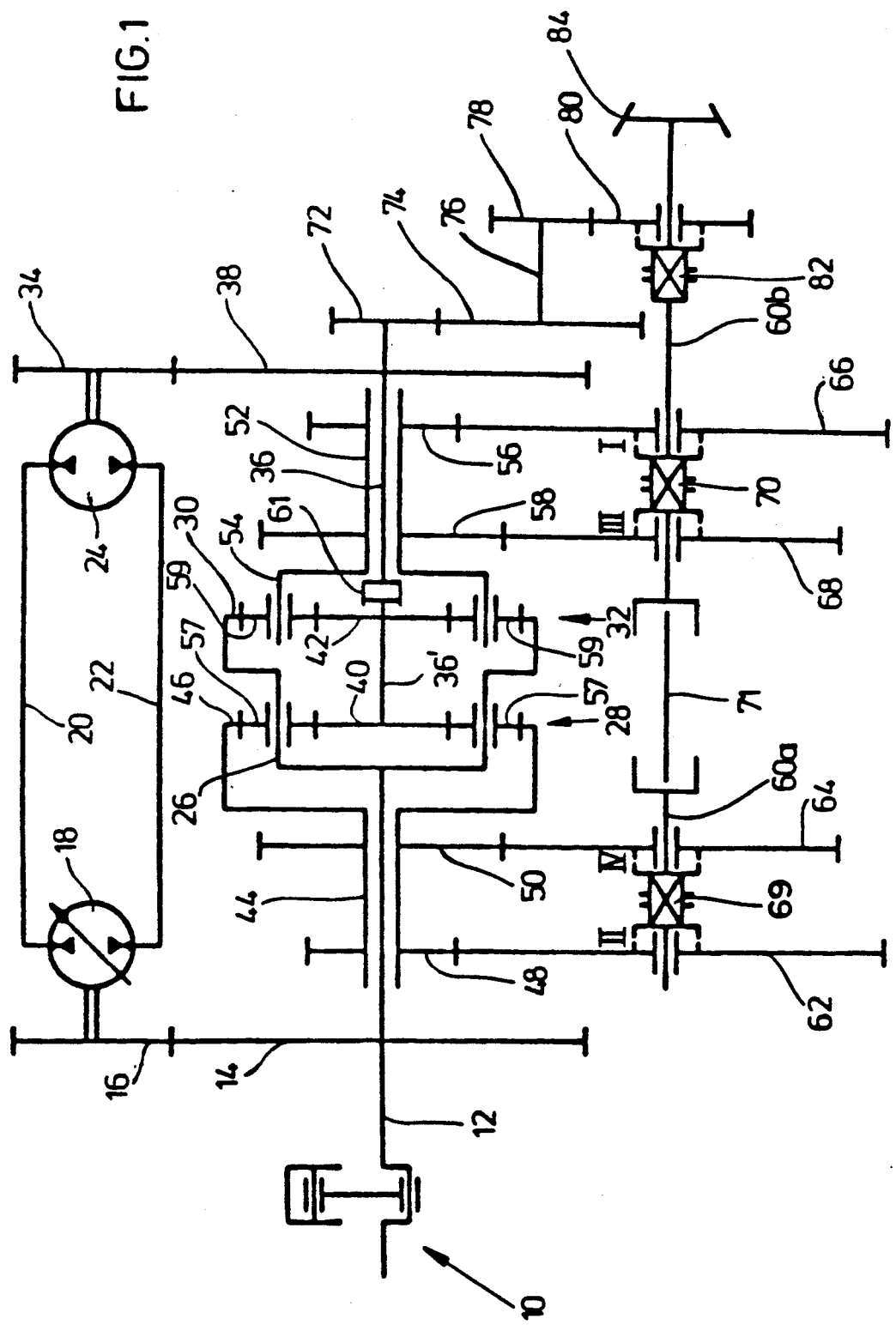
FIG. 1 is a schematic illustration of a power distributing transmission according to the present invention.

FIG. 1 shows a hydrostatic-mechanical power distributing transmission which is particularly applicable to agricultural tractors. In it, an internal combustion engine 10 delivers its torque to a gearbox input shaft 12. This drives a gear 14 which meshes with the input gear 16 of a hydraulic variable displacement device (or "controlled unit") 18, the flow volume of which can be controlled. The controlled unit 18 is hydraulically connected by hydraulic lines 20, 22 to a hydraulic constant displacement device (or "constant unit") 24, which has a constant flow volume. The controlled unit 18 can be controlled from a maximum negative flow to a maximum positive flow. Under negative flow conditions, the controlled unit 18 corresponds to a hydrostatic motor and the constant unit 24 corresponds to a pump. Under positive flow conditions, the controlled unit 18 operates as a pump and the constant unit 24 operates as a motor.

In addition to driving the gear 14, the gearbox input shaft 12 drives the planet carrier 26 of a first planetary gearset 28 and the ring gear 30 of a second planetary gearset 32. Thus, the power of the internal combustion engine 10 is distributed to both the hydrostatic drive and the mechanical dual planetary gearset.

The constant unit 24 has a gear 34 that meshes with a gear 38 mounted on the sun gear shaft 36 of the dual planetary gearset. The sun gear shaft 36 is divided and is provided in its central region with a spline 61 that connects the partial shaft 36' with the main part of the shaft 36. The designation 36 will generally be used herein to refer to the entire divided sun gear shaft 36, 36'.

The sun gear shaft 36 carries the two sun gears 40, 42 of the first and the second planetary gearsets 28, 32. Preferably, the two sun gears 40, 42 are configured as uniform, continuous sets of gear teeth on the sun gear shaft 36, so their number of teeth is identical. This configuration makes it possible to keep the sun gear diameter and the axial length of the sun gears 40, 42 small.

A section of the gearbox input shaft 12 runs inside a first hollow shaft 44 that is connected to the ring gear 46 of the first planetary gearset 28. In addition, the first hollow shaft 44 carries two gears 48, 50, fixed for rotation with the shaft 44. Similarly, a section of the sun gear shaft 36 runs inside a second hollow shaft 52 that is connected to the planet carrier 54 of the second planetary gearset 32. The second hollow shaft 52 also carries two gears 56, 58, fixed for rotation with the shaft 52.

Three planet gears 57, 59 are arranged between each of the sun gears 40, 42 and the ring gears 30, 46 of the two planetary gearsets 28, 32, spaced equally around the circumference. These are carried by the planet carriers 26, 54.

As mentioned above, the sun gear shaft 36 is divided and is provided in its central region with an involute gear spline 61 which permits radial movement of the shaft section 36' which carries the sun gears 40, 42 and insures the transmission of torque. Otherwise the shaft section 36' is not constrained in the radial direction by bearings, but is supported only by the surrounding planet gears 57, 59, so that it is free to "float" in the planet gears, 57, 59.

The gears 48, 50, 56, 58 mesh with gears 62, 64, 66, 68, respectively, which are carried on a gearbox output shaft divided into two partial shafts 60a, 60b. The gears 62, 64, 66, 68 are free to rotate about the partial shaft 60a, 60b, and can selectively be brought into engagement with the gearbox output shaft 60a, 60b by a first and a second double-acting shift sleeve 69, 70, in order to attain a first, second, third or fourth gear ratio. The gear ratios are identified as roman numerals I, II, III, IV.

The two partial shafts 60a, 60b of the gearbox output shaft are positively connected to each other by a torsion shaft 71 and rotate with equal angular velocity.

The sun gear shaft 36 also carries a creeper gear 72 that meshes with a first gear 74 of an intermediate shaft 76. A second gear 78 of the intermediate shaft 76 meshes with a fifth gear 80 on the gearbox output partial shaft 60b. Second gear 78 is free to rotate about partial shaft 60b, and can be engaged with the gearbox output partial shaft 60b by a third single-acting shift sleeve 82.

A free end of the gearbox output partial shaft 60b carries a drive pinion 84 that meshes with a ring gear, not shown, of a differential gearbox. In place of the differential gearbox driven by the pinion 84, the gearbox output partial shaft 60b may be connected to a range gearbox, not shown, to permit shifting between a high range and a low range of vehicle speeds.

Since FIG. 1 is only a schematic representation of the gearbox, the relative diameters are not to scale. In particular it is not clear in the drawing that the center section of the gearbox output shaft, in which the torsion shaft 71 is located, is positioned axially in line with and radially very close to the ring gears 30, 46 of the two planetary gearsets 28, 32, and thereby minimizes distance between the gearbox input shaft 12 and the gearbox output partial shaft 60a, 60b.

Figure 3:
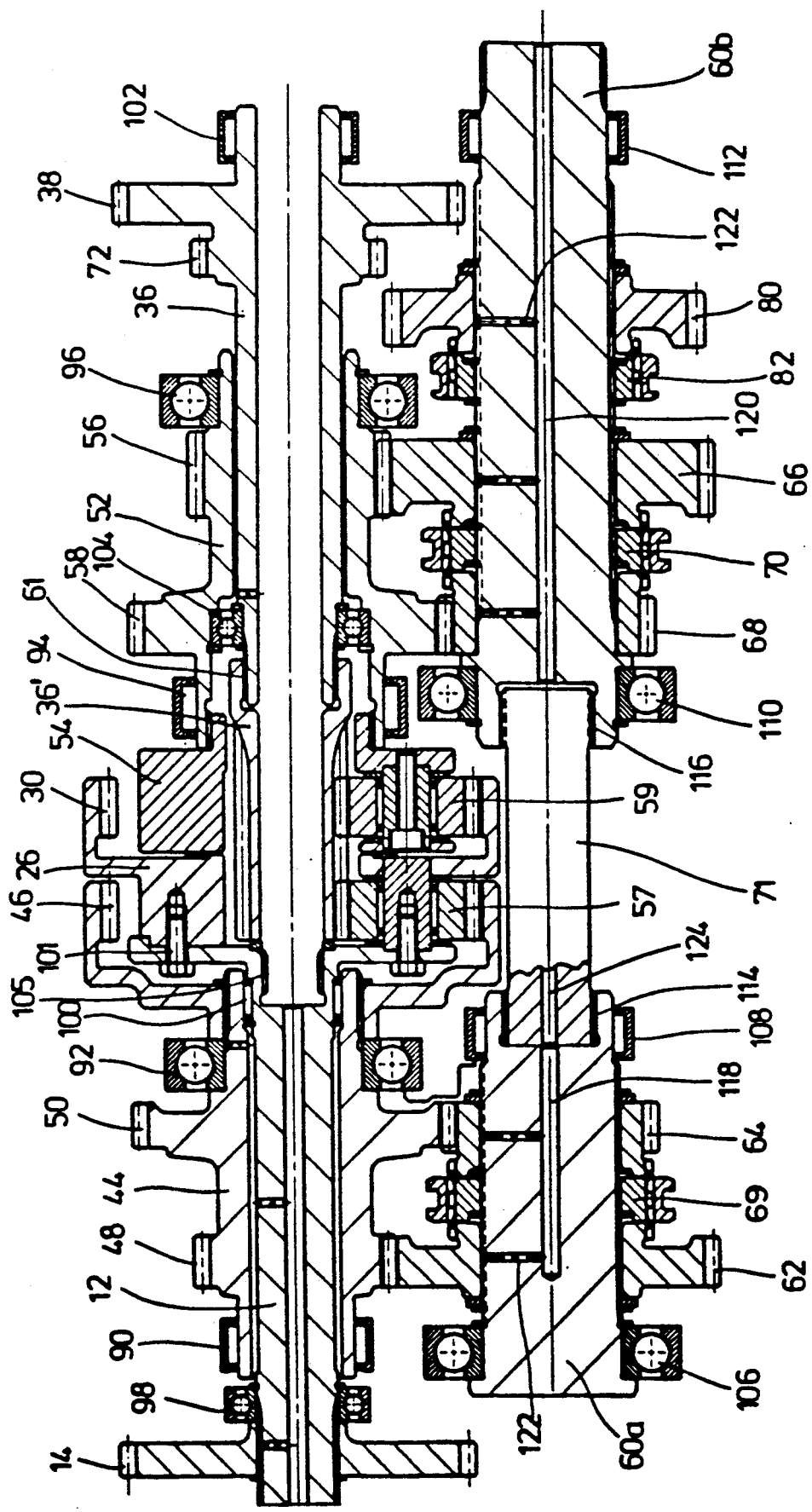
FIG. 3 is a cross-sectional view of part of a transmission of the type schematically illustrated in FIG. 1.

This close spacial relationship is better illustrated in FIG. 3, in which a part of the gear arrangement is shown in a somewhat simplified cross sectional view. The corresponding components are designated with the same reference numerals as in FIG. 1.

As shown in FIG. 3, the first hollow shaft 44 is supported by bearings 90, 92 and the second hollow shaft 52 by bearings 94, 96 in the gearbox housing, not shown. The ring gear 46 of the first planetary gearset 28 is rigidly connected by a set of gear teeth to the hollow shaft 44 and the planet carrier 54 of the second planetary gearset 32 is rigidly attached by a set of gear teeth to the second hollow shaft 52. The gearbox input shaft 12 is supported in a bearing 98 in the gearbox housing and in a bearing 100 in the first hollow shaft 44. The planet carrier 26 with the ring gear 30 is fastened by a threaded connection 101 to the gearbox input shaft 12. The sun gear shaft 36 is supported in a bearing 102 in the gearbox housing and by a second bearing 104 in the second hollow shaft 52. The sun gear shaft 36 is provided with a spline 61, configured as a set of involute gear teeth, to carry the partial shaft 36' into which the gear teeth of the sun gears 42, 44 are milled.

At the end nearest the planetary gearsets, the gearbox input shaft 12 is provided with an internal gear 105 that can drive a power takeoff shaft, not shown. Such a power take-off shaft may extend through the sun gear shaft 36, 36', which are hollow.

The partial shafts 60a, 60b are each supported in two bearings 106, 108, 110, 112 in the gearbox housing. They carry the shift sleeves 69, 70, 82, fixed against rotation, and the gears 62, 64, 68, 66, 80, freely rotatable on the shafts and which can be connected for rotation with the partial shafts 60a, 60b by the shift sleeves 69, 70, 82.

The two partial shafts 60a, 60b are axially aligned with each other. At their ends facing each other they are provided with recesses with sets of internal radial gear teeth 114, 116. The recesses engage the ends of a torsion shaft 71, which are provided with corresponding gear teeth. These sets of gear teeth preferably are involute gear teeth, and the gear teeth on the torsion shaft 71 preferably are roll-formed.

The torsion shaft 71 can move axially with respect to the partial shafts 60a, 60b within an axial clearance of, for example, approximately 2 millimeters. The torsion shaft 71 is about half as thick as the partial shafts 60a, 60b. It is located in a section of the shaft that is confined radially by the ring gears 30, 46 of the planetary gear sets. If a one-piece shaft had been used as gearbox output shaft, its outside diameter would have had to correspond at least to that of the partial shafts 60a, 60b, so that the close centerline spacing shown in FIG. 3 between the input shaft 12 and the output shaft 60 would not have been possible.

Axial bores 118, 120 and radial bores 122 are provided in the partial shafts 60a, 60b to supply lubricant to the gears 62, 64, 66, 68, 80. The axial bores 118, 120 in the partial shafts 60a, 60b are connected to each other by a bore 124 in the torsion shaft 71.

A preferred number of teeth for the various gears of the gearset described are shown in the following table. It should be emphasized that the corresponding gears of the two planetary gear sets 28, 32 have the same number of teeth and equal gear tooth geometry. Therefore the outside diameters of the two planetary gear sets 28, 32 are the same.

TABLE

| Gear Designation | Reference Numeral | Number of Teeth |
| --- | --- | --- |
| Gear of gearbox input shaft | 14 | 49 |
| Input gear of controlled unit | 16 | 25 |
| Ring gear of second planetary gearset | 30 | 52 |
| Gear of constant unit | 34 | 25 |
| Gear of sun gear shaft | 38 | 47 |
| Sun gear of first planetary gearset | 40 | 14 |
| Sun gear of second planetary gearset | 42 | 14 |
| Ring gear of first planetary gearset | 46 | 52 |
| First gear of first hollow shaft | 48 | 24 |
| Second gear of first hollow shaft | 50 | 40 |
| First gear of second hollow shaft | 56 | 24 |
| Planet gears | 57 | 19 |
| Second gear of second hollow shaft | 58 | 40 |
| Planet gears | 59 | 19 |
| First gear of output shaft | 62 | 42 |
| Second gear of output shaft | 64 | 26 |
| Third gear of output shaft | 66 | 42 |
| Fourth gear of output shaft | 68 | 26 |
| Creeper gear | 72 | 23 |
| First gear of intermediate shaft | 74 | 37 |
| Second gear of intermediate shaft | 78 | 21 |
| Fifth gear of output shaft | 80 | 40 |

OPERATION

The automatic control and regulation of the controlled unit 18 and the shifting of the shift sleeves 68, 70 82 can be performed as in known power distributing transmissions of this category (EP-A1-0 302 188).

Figure 2:
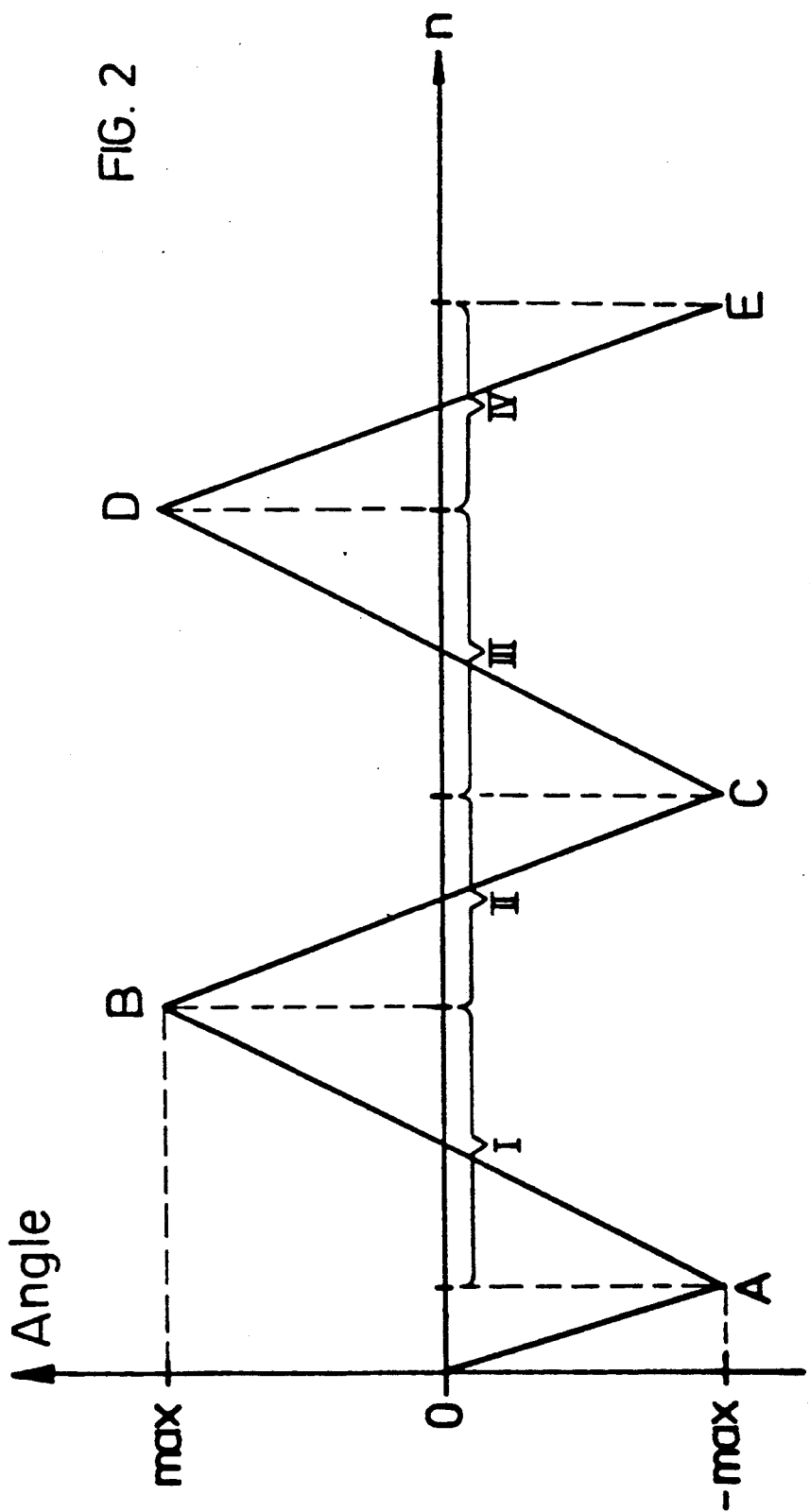
FIG. 2 is a simplified graphical representation of the relationship between the transmission output rotational speed, the deflection angle of the variable hydraulic device and the gear ratios.

Referring to FIGS. 1 and 2, operation of the power distributing transmission according to the invention is as follows:

The vehicle is started purely with the hydrostatic unit, with the first through fourth gear ratios disconnected and the fifth creeper gear 80 brought into engagement with the gearbox output shaft 60b by the third shift sleeve 82. The power flow from the internal combustion engine 10 then passes through the gearbox input shaft 12, the gears 14, 16, the controlled unit 18, the hydraulic lines 20, 22, the constant unit 24, the gears 34, 38, the sun gear shaft 36, the gears 72, 74, the intermediate shaft 76, the gears 78, 80 and the third shift sleeve 82 to the gearbox output shaft 60b. The actuation of the controlled unit 1B is initiated from its neutral position, 0, at which no flow of hydraulic fluid occurs, to a maximum negative deflection angle. As this happens, the rotational speed of the gearbox output shaft 60b increases steadily until the first shift speed A is reached. The relationship between rotational speed and deflection angle is illustrated in simplified form in FIG. 2.

Upon reaching the first shift speed A the first gear ratio I is engaged, in which the second shift sleeve 70 connects the gear 66 with the gearbox output shaft 60b, while the shift sleeve 82 is disengaged. The deflection of the controlled unit 18 now increases steadily from its maximum negative position to its maximum positive deflection angle. Now, the second planetary gearset 32 is active, with its ring gear 30 is driven at engine speed.

Initially, until reaching the 0 position of the deflection angle, the controlled unit 18 operates as a hydrostatic motor and the constant unit 24 operates as a pump driven by the sun gear shaft 36. At the first shift speed A, the sun gear shaft 36 was rotating at approximately negative engine speed, resulting in only a minimal rotational speed for the second hollow shaft 52. As the deflection angle is increased to its 0 position, the rotational speed of the sun gear shaft 36 decreases to a standstill. Simultaneously, the rotational speed of the second hollow shaft 52 and therewith also the gearbox output shaft 60b increases steadily. After passing through the 0 position, the controlled unit 18 becomes a pump that is driven by the gearbox input shaft 12 and the constant unit 24 becomes a motor that delivers power to the sun gear shaft 36. While traversing the controlled region to the maximum positive deflection, the rotational speed of the second hollow shaft 52 continues to increase. At this position, which is the second shift speed B, all shafts of both planetary gear sets 28, 32 rotate at engine speed.

Upon reaching the second shift speed B, the second gear ratio II is engaged, in which the first shift sleeve 68 connects the gear 62 with the gearbox output shaft 60a, while the second shift sleeve 70 is disengaged. Now the angle of the controlled unit 18 is decreased steadily to its maximum negative deflection angle. During this process, the first planetary gear set 28 is active. Its planet carrier 26 is driven at engine speed. At first the sun gear shaft 36 and the first hollow shaft 44 also rotate at engine speed. With the decrease in the deflection angle, the speed of the sun gear shaft 36 decreases and reaches its maximum negative value at the third shift speed C. Correspondingly the speed of the second hollow shaft 44 increases steadily and with it that of the gearbox output shaft 60a, 60b.

Upon reaching the third shift speed C, the third gear ratio III is engaged, in which the second shift sleeve 70 connects the gear 68 with the gearbox output shaft 60b, while the second shift sleeve 68 is disengaged. The controlled unit 18 is again moved in the positive direction so that the speed of the gearbox output shaft 60b increases further, as was described for the first gear ratio I, until the fourth shift speed D is reached. During this process, the second planetary gearset 32 is active.

Upon reaching the fourth shift speed D, the fourth gear ratio IV is engaged, in which the first shift sleeve 68 connects the gear 64 with the gearbox output shaft 60a and the second shift sleeve 70 is disengaged. By reducing the deflection angle of the controlled unit 18, the rotational speed of the gearbox output shaft 60a, 60b can now be increased to its maximum, which occurs at the deflection angle E. As in the case with the second gear ratio II, in the fourth gear ratio IV the second planetary gear set 28 is active. The operation of the transmission is therefore the same as described for the second gear ratio II.

If the output speed is to be reduced, the deflection angle is changed and the shift sleeves 68, 70, 82 engaged in correspondingly reverse order.

As can be seen in FIG. 2, the absolute value of the slope of the two straight lines between the shift speeds A and B, as well as between shift speeds C and D, is less than the absolute value of the slope of the straight line between the shift speeds B and C or D and E. This is due to the differing relationships for the first and third gear ratios and the second and fourth gear ratios. In each case two of the gear ratios have a corresponding relationship.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A transmission having at least two shafts arranged in parallel to each other, wherein at least one of the shafts comprises:

two partial shafts that are axially aligned with each other, spaced axially from each other and each having a splined recess formed in an end thereof facing the other partial shaft;

a torsion shaft extending between the two partial shafts, opposite ends of said torsion shaft being splined, extending into said recesses and meshing loosely with the splines on the inner surfaces of said recesses so as to positively lock said partial shafts for rotation with each other, but prevent transmission of bending moments between them.

2. The transmission of claim 1, wherein said splines are formed of involute radial gear teeth, and an axial clearance is provided between said torsion shaft and a bottom of said recess.

3. The transmission of claim 2, wherein said gear teeth are roll-formed.

4. The transmission of claim 1, wherein said torsion shaft has a diameter which is less than a diameter of at least one of said partial shafts.

5. The transmission of claim 1, further comprising additional components, and in which said torsion shaft is located in a section of said at least one shaft which is confined radially by said other components.

6. The transmission of claim 1, further comprising an axial bore formed in said torsion shaft to transmit lubricant between said partial shafts.

7. A hydrostatic-mechanical power distributing transmission for transmitting power from a prime mover, comprising:

a hydrostatic drive receiving power from the prime mover, the hydrostatic drive being continuously variable between two extreme positions and having a controlled unit and a constant unit; and a compound gearbox comprising:

a. at least two planetary gearsets for receiving power from the prime mover, and receiving power from or transmitting power to said hydrostatic drive; and b. an output shaft bearing shift sleeves and several gears which can selectively be engaged by said shift sleeves to transmit power to said output shaft, said output shaft comprising:

i. two partial shafts which are axially aligned with each other and bear said gears, each partial shaft having a splined recess formed in an end thereof facing the other partial shaft; and ii. a torsion shaft extending between said partial shafts, opposite ends of said torsion shaft being splined, extending into said recesses and meshing loosely with the splines on the inner surfaces of said recesses to positively lock said partial shafts for rotation with each other, while preventing transmission of bending moments between them.

8. The transmission of claim 7, wherein sufficient gears are provided in said compound gearbox to provide at least two gear ratios, and where said gear ratios have different control ratios.

9. The transmission of claim 8, wherein sufficient gears are provided in said compound gearbox to provide at least four gear ratios, and wherein alternating gear ratios have the same control ratios.

10. The transmission of claim 8, wherein one of said gear ratios is a principal operating range of the transmission and is provided with a smaller control ratio than the other of said gear ratios.

11. The transmission of claim 7, wherein said planetary gearsets are the same size and have the same numbers of gear teeth on their gears.

12. The transmission of claim 11, wherein the sun gears of said planetary gearsets are configured as sets of gear teeth on a one-piece shaft.

13. The transmission of claim 12, wherein said gear teeth on said shaft are involute gear teeth.

14. The transmission of claim 7, wherein said torsion shaft is positioned radially adjacent to said planetary gearsets.

15. The transmission of claim 14, wherein said torsion shaft has a diameter which is less than a diameter of at least one of said partial shafts.

* * * * *